July 8, 1952 F. R. HOLT 2,602,375
PORTABLE KEY-SEATING DEVICE
Filed Jan. 17, 1948 2 SHEETS—SHEET 1

INVENTOR.
Francis R. Holt
BY
Atty.

Patented July 8, 1952

UNITED STATES PATENT OFFICE 2,602,375

PORTABLE KEY-SEATING DEVICE

Francis R. Holt, Independence, Oreg.

Application January 17, 1948, Serial No. 2,891

3 Claims. (Cl. 90—12)

The object of my invention is to provide a relatively simple and portable machine by which keyways may be formed in shafts. It has particular application when said keyways have to be formed in the field. That is to say, said keyway machine is adapted to be transported to a shaft which is a part of an installed machine, and which requires that a keyway be formed therein. Said machine may be clamped to said shaft and power applied to the spindle of said machine to cut said keyway.

A further and more specific object of my invention is to provide a machine of this character which has simple but precise means for regulating the depth of said keyway and the length thereof.

Figure 1:
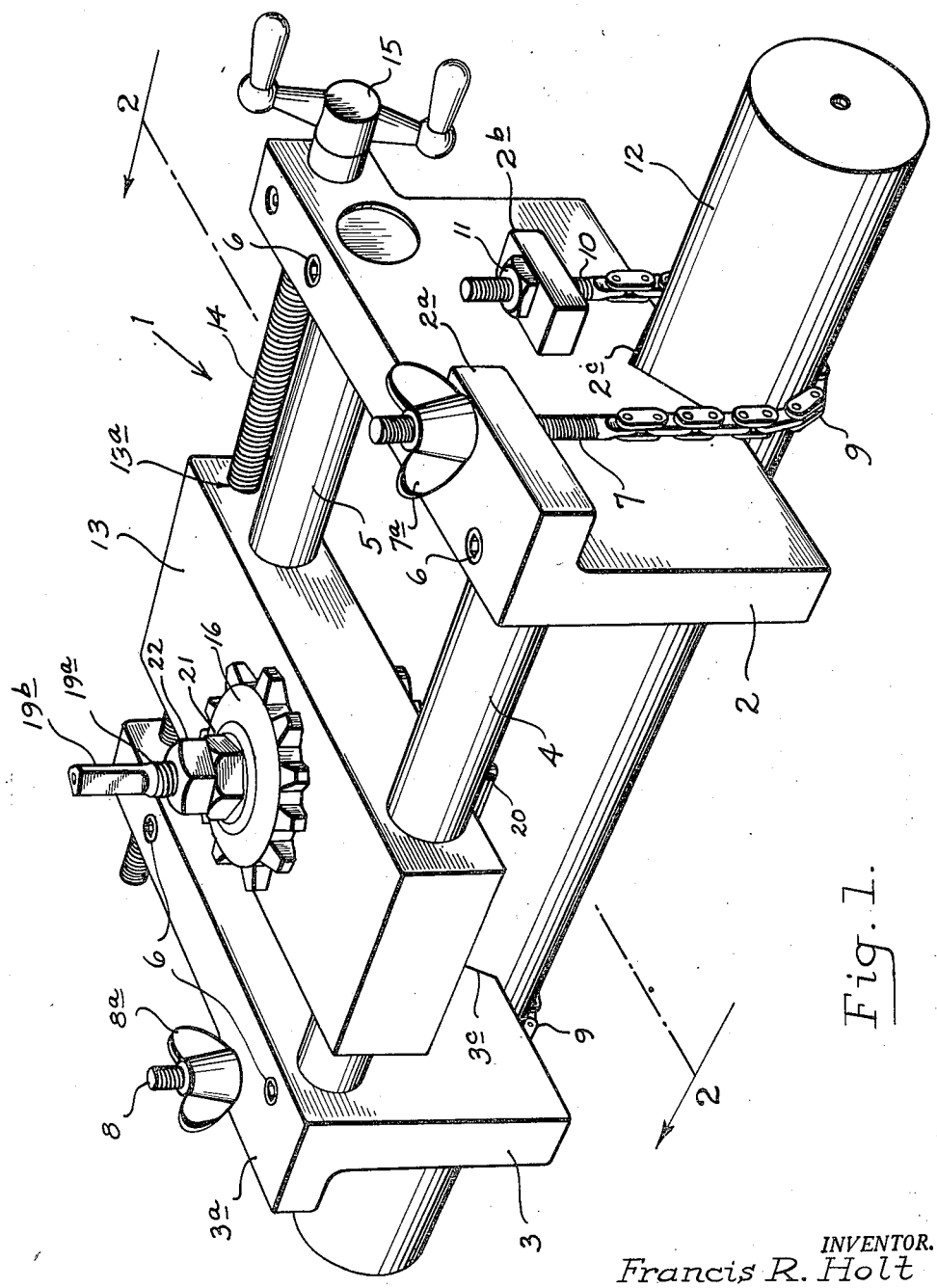
Figure 2:
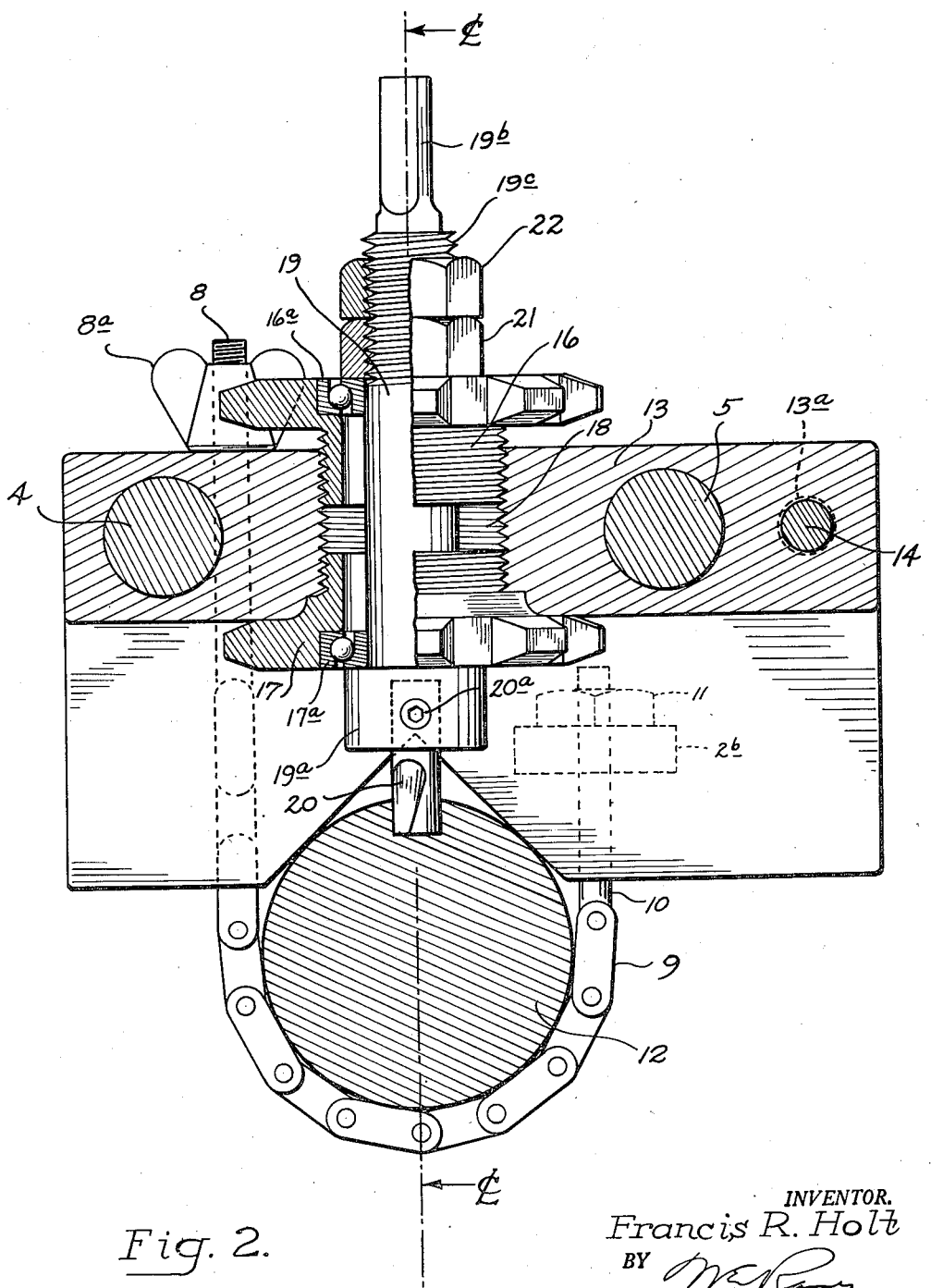

Other and further details of my invention are hereinafter described with reference to the accompanying drawings, in which:

Fig. 1 is a perspective view of a machine embodying my invention, shown secured to a shaft in which a keyway is to be formed; and Fig. 2 is a transverse sectional view through said machine and said shaft taken substantially on the line 2—2 in Fig. 1.

A portable keyway cutting machine embodying my invention comprises an elongated frame 1, comprising two spaced, transverse end members 2 and 3. Said end members are joined by two spaced guide members 4 and 5, which preferably are cylindrical in form and are fixed to the end members by set screws 6. The provision of set screws permits the spacing of said end members to be regulated easily, and, when set, permits the predetermined spacing to be fixed by setting said set screws in place in the usual manner.

Each of said end members 2 and 3 has a laterally disposed flange 2a and 3a, respectively, thereon facing outwardly and preferably alined with the upper surface of each of said end members. Each of said flanges 2a and 3a is apertured to receive a threaded adjusting screw 7 and 8, respectively. Lengths of chain 9 are secured by one end to an adjusting screw, and the other end of each of said lengths of chain is secured to a threaded member 10, in threaded engagement with a tapped hole in an outstanding flange 2b. Said threaded member 10 may be locked against movement by a nut 11, and the adjusting screws 7 and 8 may be adjusted by wing nuts 7a and 8a, respectively. The lengths of chain are thus spaced widely apart and hold the frame securely upon a shaft 12 which is to have a keyway cut therein.

Upon the lower surfaces of each of said end members are notches 2c and 3c, respectively. Said notches are symmetrical with the center line of said machine, as is indicated in Fig. 2. The sides of said notches converge obliquely toward said center line and subtend equally complementary angles with said center line. Thus, when they are seated upon a circular shaft as is shown in Fig. 2, they tend to locate the frame upon said shaft. The notches have sufficient depth to accommodate a relatively large range of diameters of shafts, and because of the oblique arrangement of the sides, said notches will accommodate any size shaft within said range with equal facility.

A tool carriage 13 is slidably mounted upon the guide members 4 and 5. A feed screw 14 is journalled in the end members 2 and 3, and is in threaded engagement with a tapped hole 13a in the tool carriage. An adjustment handle 15 is fixed to one end of the feed screw so that it may be turned to move the tool carriage, longitudinally of said guide members 4 and 5, between the inner faces of the end members 2 and 3. The tool carriage 13 preferably is flat, as is shown in Fig. 2, and two bearing members 16 and 17 are threaded into a tapped hole 18, extending through said carriage. Said hole is alined longitudinally with the notches 2c and 3c on the center line of the carriage, and a tool spindle 19 is journalled therein. Each of said bearing members 16 and 17 preferably has an anti-friction bearing 16a—17a, respectively, fixed therein. As is common, said anti-friction bearings have a drive fit in a pocket in each of said bearing members 16 and 17, respectively, so as to hold said antifriction bearings against inadvertent displacement.

Each of said bearing members is provided with laterally projecting, notched exteriors so that a good grip may be had thereon to seat them and to adjust them properly in the tapped hole 18. The relative position of said bearing members regulates the depth to which a cutting tool 20 cuts a keyway in the shaft 12. That is to say, if the bearings are adjusted so that they are moved toward the shaft, the cutting tool will cut a deeper keyway than if they are moved upwardly to the position shown in Fig. 2. Of course, the depth to which the cutting tool will cut is predetermined, also, by the length of the shank thereof. That is to say, if it were desired to cut a keyway of less depth than is indicated in Fig. 2, this may be accomplished by arranging a cutting tool with a shorter shank in said spindle so that it will cut a more shallow keyway with the parts set as indicated. Said cutting tool is held in place by a hollow head machine screw 20a in the usual manner.

The tool spindle preferably has a shouldered flange 19a at its lower end, as is shown in Fig. 2, into which the cutting tool is seated. The other end of said tool spindle terminates in a non-circular, tool-engaging end 19b. Said end is of conventional form, and it may be engaged by the chuck of an air motor, electric motor, or any other type of power device which is available.

Lying immediately inwardly of said tool-engaging end is a threaded section 19c, having an adjusting nut 21 threaded thereon and locked by a locking nut 22. The inner face of the shouldered flange 19a engages the bearing member 16, and the inner face of the adjusting nut 21 similarly engages the face of the bearing member 17. When the adjusting nut is set tightly in place, this tends to prevent the bearing members from coming out of adjustment, and tends to hold the tool spindle against gyration in said bearing members.

A portable keyway cutting machine embodying my invention is operated as follows:

When a shaft is to have a keyway formed therein, and its length and depth are determined, the frame is placed to straddle said location and is alined with the portion of the shaft in which said keyway is to be cut. The chains 9 are arranged to encircle the shaft, and they are tightened by the wing nuts 7a and 8a, respectively, until the cutting machine is fixed to the shaft, as is shown in the drawings. The tool spindle and the cutting tool arranged axially therein are automatically alined in a position radially disposed with the shaft 12, and the frame is centered on said shaft by reason of the centering notches 2c and 3c. The bearing members 16 and 17 are then adjusted so that the cutting tool will cut a keyway of proper depth into said shaft. The carriage 13 is then fed along the guide members 4 and 5 by means of the feed screw 14 until a keyway of proper length is cut in said shaft. The portable keyway cutting machine may then be easily and quickly detached by backing off the wing nut and releasing the lengths of chain 9 from the shaft.

It is, of course, possible to fix a motor permanently upon the end 19b of the tool spindle, but I deem it desirable merely to make it noncircular so that it may be engaged by any type of portable motor. In this way, the cutting machine may be made light and inexpensive and adapted for use with any type of motor which is then and there available.

I claim:

1. In a portable keyway cutting machine, the combination comprising an elongated frame including detachable flexible, encompassing chain means for securing said machine to a shaft and two spaced transverse end plates, spaced guide members joining said end plates and lying at opposite sides of the longitudinal center line of said frame, alined centering notches formed upon the under sides of said end plates, respectively, and arranged centrally with regard to said longitudinal center line of said frame and being symmetrical therewith, the sides of said notches being inclined obliquely and subtending equal complementary angles with said center line, a flat tool carriage slidably mounted upon said guide members and having an upper and a lower face, a feed screw journalled in said end members and in threaded engagement with said tool carriage, a pair of journal bearings carried by said carriage and protruding from each face thereof, a tool spindle having a non-circular end extending laterally from said carriage, said spindle being journaled in said bearings and said non-circular end being adapted for direct motor drive, said journal bearings being movably mounted in said carriage about said spindle axis, said bearings having laterally projecting adjustment grips and being adjustable relatively from opposite sides of said carriage.

2. An elongated portable keyway cutting machine, comprising two longitudinally spaced end plates, two laterally spaced guide rods joining said end plates and slidably received therein, means for detachably securing each end of each said guide rod to a companion one of said end plates, a flat tool carriage slidably mounted upon and spanning said guide members, a feed screw means having a uniform threaded diameter journaled in said end plates and threadably engaged with said carriage selectively to move the latter longitudinally, two journal bearing means threadably mounted in said tool carriage one above the other for selective adjustment toward and away from said carriage, and a tool spindle journaled in and carried by said bearing means for adjustment therewith, said spindle having a noncircular end projecting laterally from said carriage, said noncircular end being adapted for connection to a motor drive to rotate said spindle, said spindle, journal bearings and projecting end being carried in stacked relationship for mutual rotation about a common axis.

3. A portable keyway cutting machine, comprising an elongated frame having two spaced transverse end members, said members carrying detachable flexible, encompassing engaging devices for securing said machine to a shaft, or the like, laterally spaced guide members joining said end members and lying at opposite sides of the longitudinal center line of said frame, aligned centering notches formed upon the under sides of said end members, respectively, and arranged centrally with regard to said longitudinal center line of said frame and being symmetrical therewith, the sides of said notches being inclined obliquely and subtending equal complementary angles with said center line, a tool carriage slidably mounted upon said guide members, a feed screw journalled in said end members and in threaded engagement with said tool carriage, upper and lower journal bearings threadably mounted in complementary threads formed in said carriage, said upper and lower journal bearings carrying a tool spindle having a noncircular end extending laterally from said carriage and adapted for direct motor drive, said journal bearings comprising a vertically spaced companion pair of roller bearings movably mounted for vertical adjustment in said carriage about said spindle axis on said complementary threads, said tool spindle having a shoulder formed adjacent one end and engaging said lower journal bearing, said spindle being threaded at the opposite end and having a nut engaging said threaded end and bearing against the face of said upper journal bearing, said nut, spindle, and shoulder all being vertically aligned and joined for rotation upon said bearings about a common axis.

FRANCIS R. HOLT.

REFERENCES CITED

The following references are of record in the file of this patent:

UNITED STATES PATENTS

| Number | Name | Date |
|---|---|---|
| 274,906 | Campbell | Apr. 3, 1883 |
| 922,691 | Goad et al. | May 25, 1909 |
| 1,287,868 | Bucher | Dec. 17, 1918 |
| 1,321,855 | Singleton | Nov. 18, 1919 |
| 1,532,650 | Brewer | Apr. 7, 1925 |
| 2,011,835 | Stull | Aug. 20, 1935 |
| 2,373,341 | Rowe | Apr. 10, 1945 |